(12) United States Patent  
Sano et al.

(10) Patent No.: US 11,068,529 B2  
(45) Date of Patent: Jul. 20, 2021

(54) INFORMATION OUTPUT SYSTEM, INFORMATION OUTPUT METHOD, AND PROGRAM

(71) Applicant: HONDA MOTOR CO., LTD., Tokyo (JP)

(72) Inventors: Takaichi Sano, Wako (JP); Shigenori Hiruta, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 402 days.

(21) Appl. No.: 15/982,041

(22) Filed: May 17, 2018

(65) Prior Publication Data

US 2018/0365242 A1 Dec. 20, 2018

(30) Foreign Application Priority Data

Jun. 20, 2017 (JP) .............................. JP2017-120684

(51) Int. Cl.
*G06F 16/487* (2019.01)
*H04W 4/44* (2018.01)
(Continued)

(52) U.S. Cl.
CPC .......... *G06F 16/487* (2019.01); *G06F 16/435* (2019.01); *G06F 16/438* (2019.01); *H04W 4/44* (2018.02)

(58) Field of Classification Search
None
See application file for complete search history.

(56) References Cited

U.S. PATENT DOCUMENTS 9,994,229 B2 6/2018 Ricci
2014/0188920 A1* 7/2014 Sharma ................. G06F 16/635
707/758
(Continued)

FOREIGN PATENT DOCUMENTS

CN 104797484 7/2015
CN 204870584 12/2015
(Continued)

OTHER PUBLICATIONS

Japanese Office Action for Japanese Patent Application No. 2017-120684 dated Feb. 26, 2019.
(Continued)

*Primary Examiner* — James Trujillo
*Assistant Examiner* — Kurt A Mueller
(74) *Attorney, Agent, or Firm* — Amin, Turocy & Watson, LLP

(57) ABSTRACT

An information output system includes a storage device and a processing device. Content information including information of video, sound, and the like is stored in the storage device in association with personal identification information and position identification information indicating a person and a geographical position related to the content information. The processing device includes an input information acquisition unit which generates personal identification information indicating a person who is an occupant of a vehicle and position identification information indicating a current geographical position of the vehicle, an information extraction unit which extracts from the storage device the content information that is associated with personal identification information matching the generated personal identification information and position identification information indicating a position that matches the generated position identification information within a predetermined distance (Continued)

range, and an information output unit which outputs the extracted content information through a display device or the like.

11 Claims, 10 Drawing Sheets

(51) Int. Cl.
  *G06F 16/435* (2019.01)
  *G06F 16/438* (2019.01)

(56) References Cited

U.S. PATENT DOCUMENTS

| | | | |
|---|---|---|---|
| 2015/0244805 A1* | 8/2015 | Hampiholi | H04W 4/21 709/217 |
| 2016/0066013 A1* | 3/2016 | Li | H04N 21/41407 725/75 |
| 2017/0268897 A1* | 9/2017 | Yuan | B60W 40/08 |
| 2017/0350718 A1* | 12/2017 | Schulz | B60K 35/00 |
| 2017/0352185 A1* | 12/2017 | Bonilla Acevedo | B60J 1/20 |
| 2018/0329910 A1* | 11/2018 | Coburn | G06Q 10/10 |

FOREIGN PATENT DOCUMENTS

| | | |
|---|---|---|
| CN | 206086599 | 4/2017 |
| CN | 101879900 | 11/2020 |
| JP | 2008-039573 | 2/2008 |
| JP | 2015-230519 | 12/2015 |
| JP | 2016-012338 | 1/2016 |
| WO | 2013/186894 | 12/2013 |

OTHER PUBLICATIONS

Chinese Office Action for Chinese Patent Application No. 201810521828.X dated Dec. 30, 2020.

* cited by examiner

FIG. 4

REMINISCENCE INFORMATION RECORD

| REMINISCENCE RECORD IDENTIFICATION INFORMATION (ID) |
|---|
| CONTENT DATA |
| POSITION IDENTIFICATION INFORMATION |
| PERSONAL IDENTIFICATION INFORMATION (PERSON 1) |
| PERSONAL IDENTIFICATION INFORMATION (PERSON 2) |
| ⋮ |

FIG. 5

DELIVERY STATE RECORD

| STATE RECORD IDENTIFICATION INFORMATION (ID) |
|---|
| STATE DATA |
| DEVICE IDENTIFICATION INFORMATION |
| REMINISCENCE RECORD IDENTIFICATION INFORMATION |
| TERMINAL IDENTIFICATION INFORMATION (TERMINAL DEVICE 1) |
| TERMINAL IDENTIFICATION INFORMATION (TERMINAL DEVICE 2) |
| ⋮ |

FIG. 6

DELIVERY RECORD

| DELIVERY RECORD IDENTIFICATION INFORMATION (ID) |
|---|
| REMINISCENCE RECORD IDENTIFICATION INFORMATION |
| DEVICE IDENTIFICATION INFORMATION |
| STATE RECORD IDENTIFICATION INFORMATION |

INFORMATION OUTPUT SYSTEM, INFORMATION OUTPUT METHOD, AND PROGRAM

CROSS-REFERENCE TO RELATED APPLICATION

Priority is claimed on Japanese Patent Application No. 2017-120684, filed Jun. 20, 2017, the content of which is incorporated herein by reference.

BACKGROUND OF THE INVENTION

Field of the Invention

The present invention relates to an information output system, an information output method, and a program.

Description of Related Art

When two or more people are traveling on board a vehicle, talking about a topic related to the purpose or destination of the journey or the current position often causes the conversation between the occupants excited to be exciting and makes the journey agreeable. Therefore, when two or more people are traveling on board a vehicle as described above, providing information regarding a place the vehicle is passing or the like as a topic gives a benefit. In particular, for example, if reminiscences (memories) from when one of the occupants visited the place can be shared among the occupants together with images or the like constituting the reminiscences, the conversation tends to become exciting and the agreeableness of the journey is also improved.

Providing such a topic and sharing reminiscences is not limited to conversation between the occupants and the reminiscences may serve effectively as a topic for conversation, for example, between the occupants and facility employees of a destination facility (for example, a hotel which will provide lodging for the occupants) or between the occupants and family members at each occupant's home where the occupants will arrive.

A reminiscence sharing system for vehicles in which reminiscence information such as images or videos of a journey which each traveling member captured with a mobile terminal or the like is shared between the members who traveled together using a car is known in the related art as a technology for sharing image information or the like among a plurality of occupants (for example, see Japanese Unexamined Patent Application, First Publication No. 2015-230519 (hereinafter referred to as Patent Document 1)). In this system, an in-vehicle device of the car used for travel identifies mobile terminals of the members riding together in the car, collects reminiscence information from each mobile terminal, and transmits the collected reminiscence information (integrated reminiscence information) together with the information of the identified mobile terminals to the server, for example, upon arrival at the destination, and the server delivers the integrated reminiscence information to the identified mobile terminals.

However, in the system described in Patent Document 1, the in-vehicle device transmits information such as images collected from mobile terminals of the occupants to the server and the server merely delivers the collected information to each mobile terminal upon receiving the collected information. That is, in the above related-art system, reminiscences of the destination of a journey that a plurality of occupants had together can be shared among the occupants who traveled together on the journey, but past reminiscences of one of the occupants cannot be shared among occupants of a current vehicle not involved in the reminiscences and/or with people related to the occupants (such as family members or people at the destination) at an appropriate time at which the reminiscences serve effectively as a topic.

SUMMARY OF THE INVENTION

In view of the above background, it is desired to realize an information output system which allows past information of an occupant (for example, information constituting reminiscences) to be shared among a plurality of occupants and/or with people related to the occupants at an appropriate time at which the information can be a topic.

Aspects of the present invention have been made in consideration of such circumstances and it is an object of the present invention to provide an information output device, an information output method, and a program which output saved content including an image and/or a video captured and/or sound acquired during travel of a vehicle to users in an appropriate scene.

(1) An information output system according to an aspect of the present invention includes a storage device, and a processing device configured to select and output information stored in the storage device, wherein content information including information of an image, a video, and/or sound is stored in the storage device in association with personal identification information and position identification information indicating a person and a geographical position related to the content information, and the processing device includes an input information acquisition unit configured to generate personal identification information indicating a person who is an occupant of a vehicle and position identification information indicating a current geographical position of the vehicle, an information extraction unit configured to extract from the storage device the content information that is associated with personal identification information matching the personal identification information generated by the input information acquisition unit and position identification information indicating a position that matches a geographical position indicated by the position identification information generated by the input information acquisition unit within a predetermined distance range, and an information output unit configured to output the extracted content information through a display device and/or a speaker mounted on the vehicle.

(2) In the above aspect (1), the input information acquisition unit may be configured to generate the personal identification information from a facial image of the occupant of the vehicle captured by a camera mounted on the vehicle.

(3) In the above aspect (1) or (2), the processing device may further include a content information acquisition unit configured to acquire each of the information of the image, the video, and/or the sound through a camera mounted on the vehicle to acquire an image and/or a video of an external environment and/or an occupant compartment of the vehicle and/or through a microphone mounted on the vehicle and to cause the storage device to store the acquired information as the content information.

(4) In any of the above aspects (1) to (3), the processing device may further include a state information acquisition unit configured to generate delivery state information including an image, a video, and/or sound of an occupant compartment of the vehicle when the information output unit outputs the extracted content information.

(5) In the above aspect (4), the processing device may further include an information delivery unit configured to deliver the content information output by the information output unit and the delivery state information generated by the state information acquisition unit to a predetermined terminal device present outside the vehicle.

(6) In any of the above aspects (1) to (5), the storage device and the processing device may be provided in an in-vehicle device mounted on the vehicle.

(7) In any of the above aspects (1) to (5), the information output system may include an in-vehicle device mounted on the vehicle, and a server communicably connected to the in-vehicle device, the server being present outside the vehicle, wherein the processing device includes a first processing device including the input information acquisition unit and the information output unit and a second processing device including the information extraction unit, the in-vehicle device includes part of the first processing device, and the server includes the storage device and the second processing device.

(8) A server according to an aspect of the present invention includes the storage device and the second processing device and provides the configuration of the above aspect (7).

(9) An information output method according to an aspect of the present invention includes an input information acquisition unit of a processing device generating personal identification information indicating a person who is an occupant of a vehicle and position identification information indicating a current geographical position of the vehicle, an information extraction unit of the processing device extracting content information that is associated with personal identification information matching the generated personal identification information and position identification information indicating a position that matches a geographical position indicated by the generated position identification information within a predetermined distance range from a storage device configured to store content information including information of an image, a video, and/or sound in association with personal identification information and position identification information indicating a person and a geographical position related to the content information, and an information output unit of the processing device outputting the extracted content information through a display device and/or a speaker mounted on the vehicle.

(10) A program according to an aspect of the present invention causes an in-vehicle device which is a computer mounted on a vehicle to function as an input information acquisition unit configured to generate personal identification information indicating a person who is an occupant of the vehicle and position identification information indicating a current geographical position of the vehicle, an information extraction unit configured to extract content information that is associated with personal identification information matching the personal identification information generated by the input information acquisition unit and position identification information indicating a position that matches a geographical position indicated by the position identification information generated by the input information acquisition unit within a predetermined distance range from a storage device configured to store content information including information of an image, a video, and/or sound in association with personal identification information and position identification information indicating a person and a geographical position related to the content information, and an information output unit configured to output the extracted content information through a display device and/or a speaker mounted on the vehicle.

(11) A program according to an aspect of the present invention causes an in-vehicle device which is a computer mounted on a vehicle to function as an input information acquisition unit configured to generate personal identification information indicating a person who is an occupant of the vehicle and position identification information indicating a current geographical position of the vehicle and to transmit the generated personal identification information and position identification information to a server disposed outside the vehicle, and an information output unit configured to output content information received from the server through a display device and/or a speaker mounted on the vehicle.

(12) A program according to an aspect of the present invention causes a server which is a computer disposed outside a vehicle to function as an information extraction unit configured to receive personal identification information indicating a person who is an occupant of a vehicle and position identification information indicating a current geographical position of the vehicle from an in-vehicle device of the vehicle, and to extract content information that is associated with personal identification information matching the received personal identification information and position identification information indicating a position that matches a geographical position indicated by the received position identification information within a predetermined distance range from a storage device configured to store content information including information of an image, a video, and/or sound in association with personal identification information and position identification information indicating a person and a geographical position related to the content information.

According to the aspects of the present invention, it is possible to provide an information output system, an information output method, and a program which output saved content including an image and/or a video captured and/or sound acquired during travel of a vehicle to users in an appropriate scene.

BRIEF DESCRIPTION OF THE DRAWINGS

FIG. 4 is a diagram showing an exemplary configuration of a reminiscence information record saved in a storage device of the server shown in FIG. 3.

FIG. 5 is a diagram showing an exemplary configuration of a delivery state record saved in the storage device of the server shown in FIG. 3.

FIG. 6 is a diagram showing an exemplary configuration of a delivery record saved in the storage device of the server shown in FIG. 3.

DETAILED DESCRIPTION OF THE INVENTION

Hereinafter, embodiments of the present invention will be described with reference to the drawings.

Figure 1:
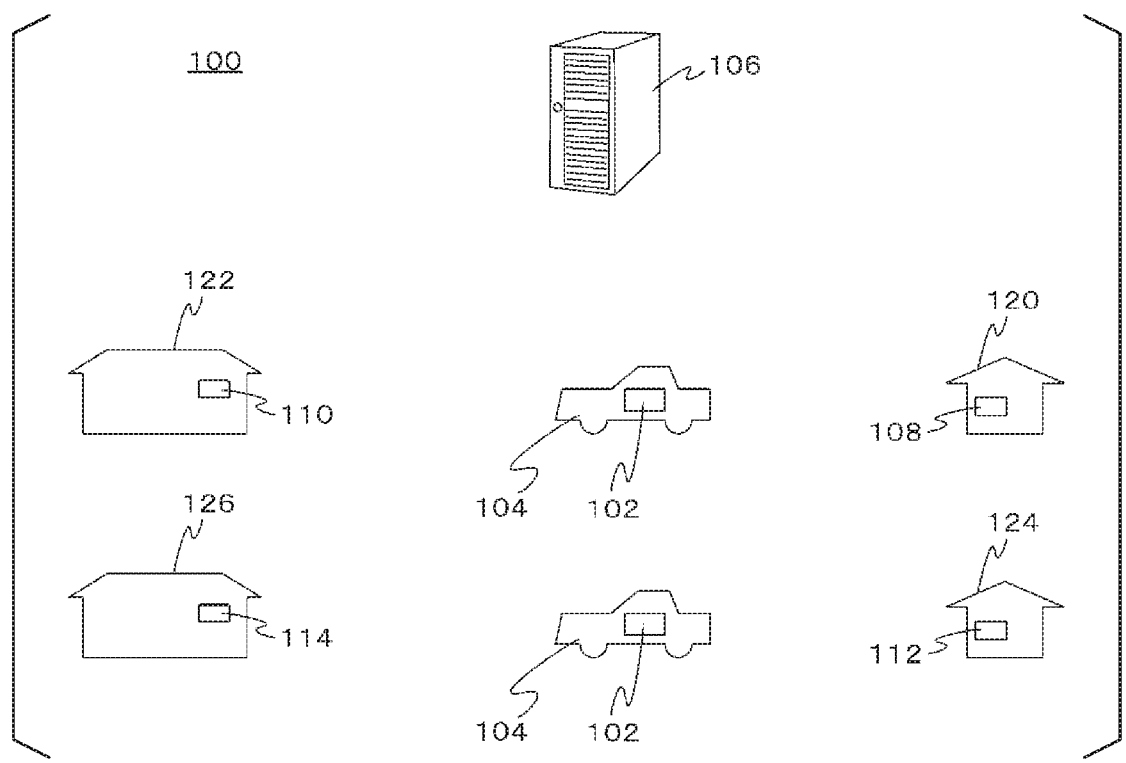
FIG. 1 is a diagram showing a configuration of an information output system according to an embodiment of the present invention.

FIG. 1 is a diagram showing a configuration of an information output system according to an embodiment of the present invention. In this information output system 100, information regarding reminiscences of experiences that at least one person who was an occupant of a vehicle had in the past on board the vehicle (reminiscence information) is output as an example of information output to users at an appropriate time at which the information can be a topic such that the information can be shared among a plurality of current occupants and/or with people related to the occupants. However, the information output to users is not limited to reminiscence-related information and may be any information obtained when a person rides in a vehicle (any information that can be acquired through a camera or a microphone, for example, such as a facial expression of an occupant, music played in the occupant compartment, or scenery outside the vehicle).

The system 100 includes at least one vehicle 104 on which an in-vehicle device 102 is mounted and a server 106 disposed outside the vehicle 104. In-vehicle devices 102 and the server 106 are communicably connected, for example, through wireless communication.

The server 106 is also communicably connected to predetermined terminal devices 108, 110, 112, and 114. The terminal devices 108 and 110 are installed, for example, in a house 120 which is the home of one occupant of the vehicle 104 that is shown on the upper side among the two vehicles 104 in FIG. 1, and a facility 122 (for example, a lodging facility) which is a destination of the vehicle 104, respectively. The terminal devices 112 and 114 are installed, for example, in a house 124 which is the home of one occupant of the vehicle 104 that is shown on the lower side among the two vehicles 104 in FIG. 1, and a facility 126 (for example, a day service facility) which is a destination of the vehicle 104, respectively.

Although the four predetermined terminal devices 108, 110, 112, and 114 are shown here, the present invention is not limited to this and any number of terminal devices may be communicably connected to the server 106. Likewise, although the two vehicles 104 are shown here, the present invention is not limited thereto and in-vehicle devices 102 mounted on any number of vehicles 104 may be communicably connected to the server 106.

The server 106 may be, for example, a so-called cloud server that is connected to the in-vehicle devices 102, the terminal devices 108, or the like via an internet line network or a telephone line network.

Figure 2:
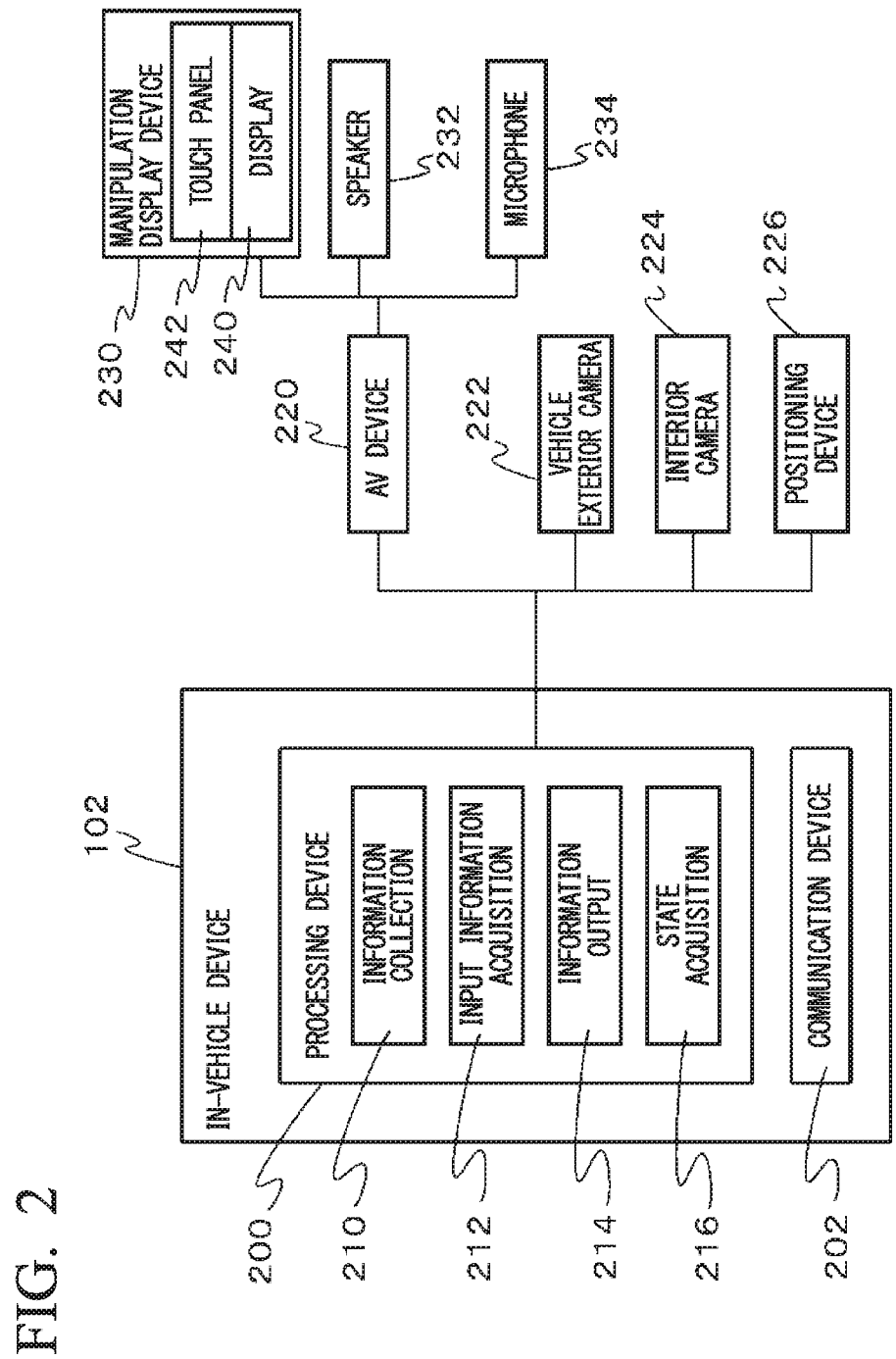
FIG. 2 is a diagram showing a configuration of an in-vehicle device included in the information output system shown in FIG. 1.

FIG. 2 is a diagram showing a configuration of an in-vehicle device 102 mounted on a vehicle 104. The in-vehicle device 102 includes a processing device 200 and a communication device 202. The processing device 200 transmits and receives data to and from an audio/visual (AV) device 220, a vehicle exterior camera 222, an interior camera 224, and a positioning device 226 which are mounted on the vehicle 104 with the in-vehicle device 102 mounted thereon (hereinafter referred to as a host vehicle 104). A manipulation display device 230, a speaker 232, and a microphone 234 mounted on the host vehicle 104 are connected to the AV device 220.

The manipulation display device 230 includes, for example, a display 240 such as a liquid crystal display device and a touch panel 242 disposed on a screen of the display 240. The display 240 displays an image or a video on the screen of the display 240 on the basis of a signal transmitted from the AV device 220. The user can also input data, a command, or the like to the AV device 220 using the touch panel 242.

For example, in addition to a function of reproducing music or a video stored in a storage medium such as a CD, a DVD, or a USB memory on the basis of a command that the user has input through the touch panel 242 and outputting the music or video to the speaker 232 and/or the display 240, the AV device 220 has a function of relaying the image, video, and/or sound output from the in-vehicle device 102, outputting the image and/or video to the display 240, and/or outputting the sound to the speaker 232. In response to a request from the in-vehicle device 102, the AV device 220 collects sound in the occupant compartment of the host vehicle 104 through the microphone 234 and sends the collected sound to the in-vehicle device 102.

The vehicle exterior camera 222 is provided, for example, on a bumper or a side mirror of the host vehicle 104 to image an environment in front of and/or to the side of the host vehicle 104. The interior camera 224 is provided, for example, on an interior mirror of the host vehicle 104 to image a whole view of the occupant compartment of the host vehicle 104 (a range of angle of view in which it is possible to image at least the faces of all occupants).

The positioning device 226 is, for example, a GPS device and outputs positioning data indicating the current position of the host vehicle 104.

The communication device 202 included in the in-vehicle device 102 is, for example, a wireless communication device that communicably connects the in-vehicle device 102 to the server 106.

The processing device 200 included in the in-vehicle device 102 is a computer having a processor such as a central processing unit (CPU), a read only memory (ROM) with a program written thereto, a random access memory (RAM) for temporarily storing data, and the like and includes an information collection unit 210, an input information acquisition unit 212, an information output unit 214, and a state acquisition unit 216.

Each of the units included in the processing device 200 is realized by causing the processing device 200 which is a computer to execute a program, which can be stored in any computer-readable storage medium. Alternatively or additionally, each of the units may be wholly or partially constituted by hardware including one or more electronic circuit parts.

The information collection unit 210 starts operation, for example, in response to receiving an instruction to start an information collection operation from a user via the touch panel 242. Upon starting operation, the information collection unit 210 acquires an image and/or a video of the occupant compartment of the host vehicle 104 through the interior camera 224, acquires an image and/or a video of an environment of the host vehicle 104 (in front of or to the side of the host vehicle 104) through the vehicle exterior camera 222, and/or collects music played in the host vehicle 104, the sound of the vehicle's environment entering the vehicle from outside, or the sound of an occupant's conversation or the like through the microphone 234 via the AV device 220. The information collection unit 210 acquires positioning data indicating a geographical position of the host vehicle 104 at the time of collecting the image, video, and/or sound from the positioning device 226 and generates position identification information (for example, including a latitude and a longitude) representing the geographical position.

The information collection unit 210 also recognizes each person who is an occupant of the host vehicle 104 from the acquired image or video of the occupant compartment of the host vehicle 104 and generates personal identification information identifying each recognized person. The personal identification information may include, for example, an identification code assigned to each person. The personal identification information may be generated, for example, by causing the in-vehicle device 102 to learn an image (for example, a facial image) of each person in association with the identification code of the person (for example, causing a storage device (not shown) provided in the in-vehicle device 102 to store the image) in advance and causing the information collection unit 210 to perform image matching between the learned person's image and the occupant's image. Such techniques for person identification through person image learning and image matching are known and thus descriptions thereof are omitted herein.

Then, the information collection unit 210 transmits a reminiscence information recording request including content data including the collected image, video, and/or sound data, the generated position identification information, and the generated personal identification information of each occupant to the server 106 via the communication device 202. As will be described later, in response to receiving the reminiscence information recording request, the server 106 adds and saves the content data, the position identification information, and the personal identification information included in the reminiscence information recording request in the reminiscence information DB 306 in the storage device 300 as a reminiscence information record.

Here, one collection period of time during which images, videos, and/or sound constituting content data are collected may be predetermined (for example, as 5 minutes) and the information collection unit 210 may generate and transmit, for example, a reminiscence information recording request using content data including images, videos, and/or sound collected during the predetermined collection period of time.

The input information acquisition unit 212 starts operation, for example, in response to receiving an instruction to start an information provision operation from a user via the touch panel 242. Upon starting operation, the input information acquisition unit 212 acquires an image in the occupant compartment of the host vehicle 104 through the interior camera 224, recognizes each person who is an occupant of the host vehicle 104 from the acquired image, and generates personal identification information identifying each recognized person. The input information acquisition unit 212 acquires positioning data indicating the current geographical position of the host vehicle 104 from the positioning device 226 and generates position identification information representing the geographical position.

Then, the input information acquisition unit 212 transmits a reminiscence information provision request including the generated personal identification information and position identification information and device identification information (for example, an ID code) specifying the in-vehicle device 102 to the server 106 via the communication device 202. As will be described later, in response to receiving the transmitted reminiscence information provision request, the server 106 extracts from the reminiscence information DB 306 stored in the storage device 300 a reminiscence information record including position identification information indicating the same geographical position as that indicated by the position identification information included in the reminiscence information provision request or indicating a geographical position within a predetermined distance range from the geographical position indicated by the position identification information among reminiscence information records including the same personal identification information as the personal identification information included in the reminiscence information provision request.

Then, the server 106 transmits the extracted reminiscence information record to the in-vehicle device 102 of the vehicle 104 which has transmitted the reminiscence information provision request. The extracted reminiscence information record is transmitted to the in-vehicle device 102 by attaching the device identification information included in the received reminiscence information provision request to the extracted reminiscence information record to indicate that the transmission destination of the reminiscence information record is the specific in-vehicle device 102.

Here, note that that the input information acquisition unit 212 repeatedly transmits the reminiscence information provision request including the position identification information indicating the latest current position of the host vehicle 104 until the in-vehicle device 102 receives the reminiscence information record from the server 106. As a result, when the host vehicle 104 has reached a position where a reminiscence information record was generated, the server 106 extracts the reminiscence information record generated in the past at the position and delivers the extracted reminiscence information record to the in-vehicle device 102.

The information output unit 214 starts operation in response to the communication device 202 receiving the reminiscence information record which has been transmitted from the server 106 to the in-vehicle device 102. It can be determined that the received reminiscence information record is destined for the in-vehicle device 102 on the basis of matching between the device identification information included in the received reminiscence information record and device identification information of the in-vehicle device 102.

Upon starting operation, the information output unit 214 reproduces content data included in the reminiscence information record, which the communication device 202 has received from the server 106, through the AV device 220. That is, an image and/or a video included in the content data is displayed on the display 240 and/or sound included in the content data is output through the speaker 232 to be provided to the occupant of the host vehicle 104. The information output unit 214 ends operation upon completion of the reproduction of the content data included in the reminiscence information record received through the communication device 202.

The state acquisition unit 216 starts operation when the information output unit 214 starts reproducing the content data of the reminiscence information record. Upon starting operation, the state acquisition unit 216 images the occupant compartment of the host vehicle 104 through the interior camera 224 and acquires the sound of the occupant compartment through the microphone 234 via the AV device 220 while the reminiscence information record is being reproduced. Then, the state acquisition unit 216 transmits a delivery state recording request including reminiscence record identification information of the reminiscence information record currently being reproduced, state data including the acquired video and sound in the occupant compartment, and terminal identification information of a terminal device to which the state data is to be delivered to the server 106 via the communication device 202.

Here, the "terminal device to which the state data is to be delivered" may be at least one of the predetermined terminal devices 108 and the like shown in FIG. 1. That is, the "terminal device to which the state data is to be delivered" may be, for example, a terminal device provided in a house which is the home of one occupant of the vehicle 104 and/or a destination facility of the vehicle 104. This may also be a terminal device located in a house in which a person corresponding to the reminiscence information to be delivered resides.

The "terminal device to which the state data is to be delivered" may be predetermined for personal identification information of each person who can become an occupant of the host vehicle 104 and/or for each destination of the host vehicle 104 and may be stored in the storage device 300 or the user may designate the terminal device (for example, input the terminal identification information) when inputting the information provision operation start instruction via the touch panel 242.

Figure 3:
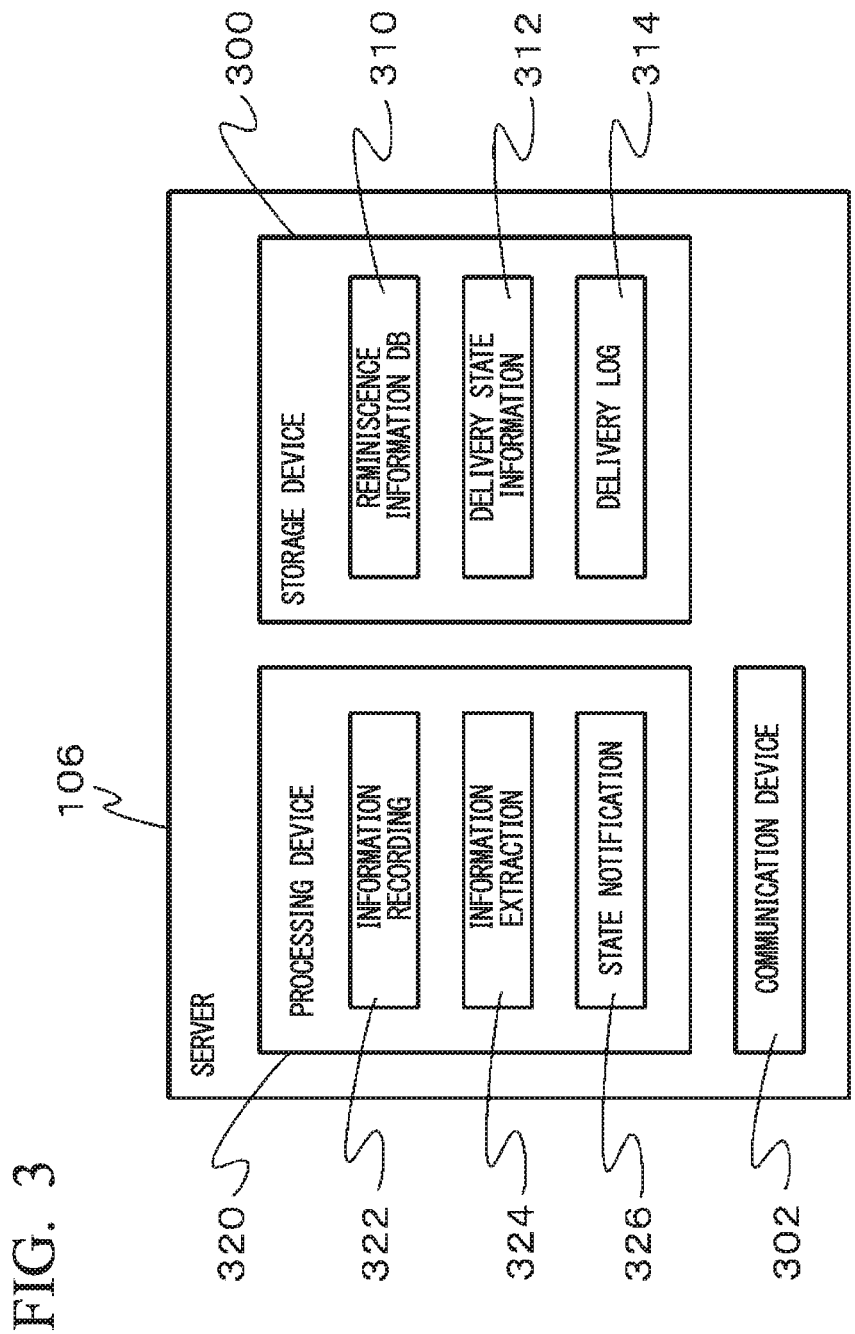
FIG. 3 is a diagram showing a configuration of a server included in the information output system shown in FIG. 1.

FIG. 3 is a diagram showing a configuration of the server 106. The server 106 includes a storage device 300, a communication device 302, and a processing device 320.

The storage device 300 stores a reminiscence information database (DB) 310, delivery state information 312, and a delivery log 314. The reminiscence information DB 310 includes one or more reminiscence information records. FIG. 4 is a diagram showing an exemplary configuration of a reminiscence information record. Each reminiscence information record includes reminiscence record identification information, content data including an image or a video of the environment of the vehicle at a specific geographical position when at least one specific person has been riding in the vehicle at the specific geographical position and/or an image, a video, and/or sound in the occupant compartment of the vehicle, position identification information indicating the position, and personal identification information indicating the at least one specific person. Here, the reminiscence record identification information includes a unique code (for example, a unique ID code) for identifying the reminiscence information record from other reminiscence information records. The reminiscence information record is generated by the information recording unit 322 which will be described later in response to the server 106 receiving the reminiscence information recording request and is added and saved in the reminiscence information DB 310.

The delivery state information 312 includes one or more delivery state records. FIG. 5 is a diagram showing an exemplary configuration of a delivery state record. Each delivery state record includes state record identification information, and state data, device identification information, reminiscence record identification information, and terminal identification information indicating at least one terminal device which are included in the delivery state recording request received from the in-vehicle device 102. Here, the state record identification information includes a unique code (for example, a unique ID code) for identifying the delivery state record from other delivery state records. The delivery state record is generated by the state notification unit 316 which will be described later in response to the server 106 receiving the delivery state recording request and is saved in the storage device 300.

The delivery log 314 includes one or more delivery records. FIG. 6 is a diagram showing an exemplary configuration of a delivery record. Each delivery record includes delivery record identification information, reminiscence record identification information of a reminiscence information record extracted and delivered from the reminiscence information DB 310 by an information extraction unit 324 which will be described later, device identification information of the in-vehicle device 102 which is the delivery destination of the reminiscence information record, and state record identification information of a delivery state record including state data acquired at the vehicle 104 when the reminiscence information record has been delivered to the vehicle 104. Here, the delivery record identification information includes a unique code (for example, a unique ID code) for identifying the delivery record from other delivery records.

The delivery record is generated by the information extraction unit 324 which will be described later when the information extraction unit 324 delivers the reminiscence information record and is saved in the storage device 300. When the delivery state record is generated, the state notification unit 316 which will be described later adds and records state record identification information of the generated delivery state record to a delivery record including reminiscence record identification information of a reminiscence information record related to the generated delivery state record and device identification information of an in-vehicle device 102 related thereto.

The communication device 302 is, for example, a wireless communication device that communicably connects the server 106 to the in-vehicle device 102 of the vehicle 104 and the terminal devices 108, 110, 112, and 114.

The processing device 320 is a computer having a processor such as a CPU, a ROM with a program written thereto, a RAM for temporarily storing data, and the like and includes the information recording unit 322, the information extraction unit 324, and the state notification unit 326.

Each of the units included in the processing device 320 is realized by causing the processing device 320 (a computer) to execute a program, which can be stored in any computer-readable storage medium. Alternatively or additionally, each of the units may be wholly or partially constituted by hardware including one or more electronic circuit parts.

In response to receiving a reminiscence information recording request from an in-vehicle device 102 of any one of the vehicles 104 via the communication device 302, the information recording unit 322 adds and saves content data, position identification information, and personal identification information included in the received reminiscence information recording request in the reminiscence information DB 310 in the storage device 300 as a reminiscence information record.

In response to receiving a reminiscence information provision request from an in-vehicle device 102 of any one of the vehicles 104 via the communication device 302, the information extraction unit 324 extracts a reminiscence information record including position identification information indicating the same position as that indicated by position identification information included in the received reminiscence information provision request or indicating a position within a predetermined distance range from the position indicated by the position identification information, among reminiscence information records including the same personal identification information as any personal identification information included in the received reminiscence information provision request, from the reminiscence information DB 310 stored in the storage device 300.

Then, the information extraction unit 324 transmits the extracted reminiscence information record to the in-vehicle device 102 of the vehicle 104 which has transmitted the reminiscence information provision request via the communication device 302 (that is, transmits the extracted reminiscence information record by attaching device identification information included in the reminiscence information provision request to the reminiscence information record). Here, when there are a plurality of extracted reminiscence information records, the input information acquisition unit 212 sequentially transmits all of the plurality of extracted reminiscence information records.

When transmitting the extracted reminiscence information record to the in-vehicle device 102, the information extraction unit 324 generates a delivery record including reminiscence record identification information of the transmitted reminiscence information record and device identification information of the in-vehicle device 102 which is the transmission destination of the reminiscence information record and adds and saves the generated delivery record in the delivery log 314 in the storage device 300.

In response to receiving a delivery state recording request from an in-vehicle device 102 of any one of the vehicles 104 via the communication device 302, the state notification unit 326 adds and saves state data, device identification information, reminiscence record identification information, and terminal identification information included in the received delivery state recording request in the delivery state information 312 in the storage device 300 as a delivery state record.

The state notification unit 326 searches the delivery log 314 to extract therefrom delivery records having device identification information and reminiscence record identification information matching the device identification information and the reminiscence record identification information included in the received delivery state recording request and adds and saves the state record identification information of the delivery state record added and saved in the delivery state information 312 in the extracted delivery record.

Thereafter, the state notification unit 326 transmits the state data included in the generated delivery state record and a reminiscence information record in the reminiscence information DB 310 indicated by the reminiscence record identification information included in the delivery state record to each terminal device having the terminal identification information included in the generated delivery state record.

After delivering the state data and the reminiscence information record, the state notification unit 326 deletes the delivery record used for the delivery from the delivery log 314 and deletes the generated delivery state record from the storage device 300. Note that it is not indispensable in this embodiment to generate and hold the delivery state record and the delivery record until transmission of the state record or the like is completed. However, this configuration gives a benefit, for example, in that the server 106 can redeliver the state data or the like in response to a request from the terminal device 108 or the like.

The information output system 100 configured as described above associates an image, a video, and/or sound inside and outside the vehicle 104 with a position of the vehicle 104 at that time and a person who is an occupant of the vehicle 104 and stores the image, video and/or sound associated therewith in the server 106 as a reminiscence information record. When at least one person who was an occupant is riding in any vehicle 104 and travels near the position, the reminiscence information record associated with the person and the position is transmitted from the server 106 to an in-vehicle device 102 of the vehicle 104 and the image, video, and/or sound included in the reminiscence information record are reproduced in the vehicle 104.

When the reminiscence information record is reproduced in the vehicle 104, the reproduced reminiscence information record and state data indicating an inside state of the vehicle 104 at the time of the reproduction (that is, an image, a video, and sound in the occupant compartment) are delivered to a specific terminal device (such as the terminal device 108) in the home of the occupant of the vehicle 104, a lodging facility which is the destination of the vehicle 104, and/or the like.

Accordingly, a reminiscence (i.e., an image, a video, and/or sound from the past) at a certain geographical position of a person who is an occupant of the vehicle 104 is provided to the interior of the vehicle 104 and shared among the occupants at an appropriate time when the vehicle 104 travels near the position and is also shared with family members or people in the lodging facility related to the occupants.

Here, the content data included in the reminiscence information record described above corresponds to the content information and the state data included in the delivery state record described above corresponds to the delivery state information. In addition, the information collection unit 210 and the information recording unit 322 correspond to the content information acquisition unit and the state notification unit 326 corresponds to the information delivery unit. Further, the processing device 200 corresponds to the first processing device and the processing device 320 corresponds to the second processing device.

Next, operations of the in-vehicle device 102 and the server 106 which constitute the information output system 100 will be described.

<Operation of In-Vehicle Device>

Hereinafter, the operation of the in-vehicle device 102 will be described. The in-vehicle device 102 performs a reminiscence information collection process and a reminiscence information output process.

[Reminiscence Information Collection Process]

Figure 7:
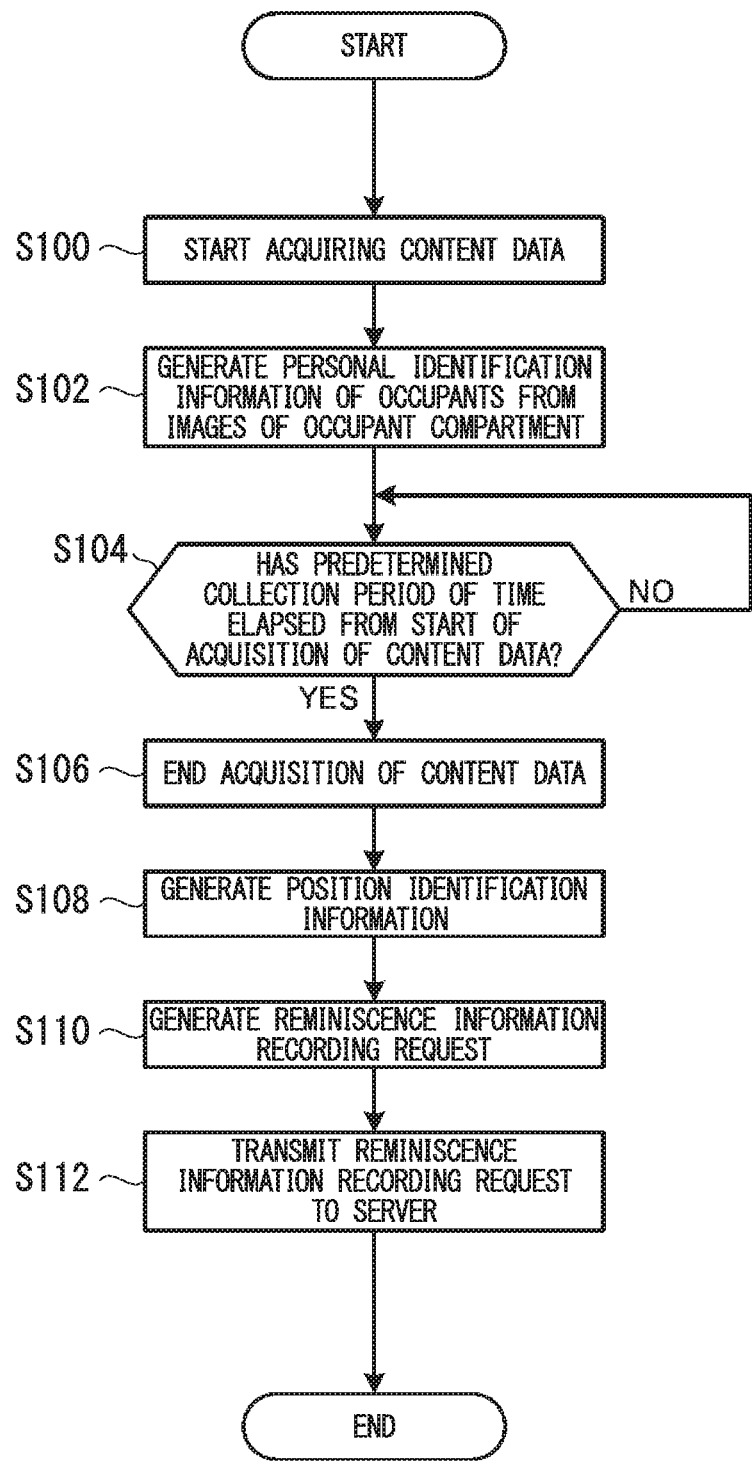
FIG. 7 is a flowchart showing a procedure of a reminiscence information collection process executed by an in-vehicle device shown in FIG. 2.

First, a procedure of the reminiscence information collection process performed by the in-vehicle device 102 will be described with reference to a flowchart shown in FIG. 7. The reminiscence information collection process is a process of collecting images, videos, and/or sound by the vehicle exterior camera 222, the interior camera 224, and/or the microphone 234 and generating reminiscence information having these images, videos, and sounds as content data.

This process starts, for example, in response to receipt of an instruction to start an information collection operation from the user via the touch panel 242. However, the process may start with the occurrence of a specific event as a trigger without being limited to such a start instruction from the user. For example, the process may start upon detecting an exciting state of a conversation in the vehicle from an image of the interior camera 224 (for example, upon detecting that the frequency or duration of an occupant's smile has exceeded a predetermined threshold) and/or upon detecting a specific situation in the vehicle by the microphone 234 (for example, upon detecting that the length or frequency of speech or the vocal volume of an occupant has exceeded a predetermined threshold).

Upon starting the process, first, the information collection unit 210 of the in-vehicle device 102 starts acquiring content data of reminiscence information (S100). The content data includes images and videos of external environments of the host vehicle 104 and/or images, videos, and/or sound in the occupant compartment of the host vehicle 104. The information collection unit 210 acquires these images, videos, and/or sound through the vehicle exterior camera 222, the interior camera 224, and/or the microphone 234.

Next, the information collection unit 210 recognizes occupants of the host vehicle 104 from images in the occupant compartment acquired by the interior camera 224 and generates personal identification information indicating each occupant (S102). Then, the information collection unit 210 determines whether or not a predetermined collection period of time has elapsed from the start of acquisition of the content data in step S100 (S104). When the predetermined collection period of time has not elapsed (NO in S104), the process returns to step S104 and waits until the predetermined collection period of time elapses.

On the other hand, when the predetermined collection period of time has elapsed (YES in S104), the information collection unit 210 ends the acquisition of the content data (S106) and generates position identification information indicating the current position of the host vehicle 104 using positioning data (for example, GPS data) output from the positioning device 226 (S108). Then, the information collection unit 210 generates a reminiscence information recording request including the acquired content data, the device identification information of the in-vehicle device 102, the personal identification information of the occupants generated in step S102, and the position identification information generated in step S108 (S110), transmits the generated reminiscence information recording request to the server 106 through the communication device 202 (S112), and ends this reminiscence information collection process.

In the present embodiment, after the predetermined collection period of time has elapsed from the start of acquisition of content data, the collection of content data is ended and a reminiscence information recording request is transmitted, but the present invention is not limited to this. For example, content data may be collected during a predetermined collection period of time repeatedly at predetermined time intervals (for example, at intervals of 15 minutes) until an instruction to end the information collection operation is received from the user via the touch panel 242 and a reminiscence information recording request may be transmitted. Alternatively, content data may be continuously collected until the end instruction is received, the collection of content data may be ended in response to receipt of the end instruction, and a reminiscence information recording request may be transmitted.

[Reminiscence Information Output Process]

Figure 8:
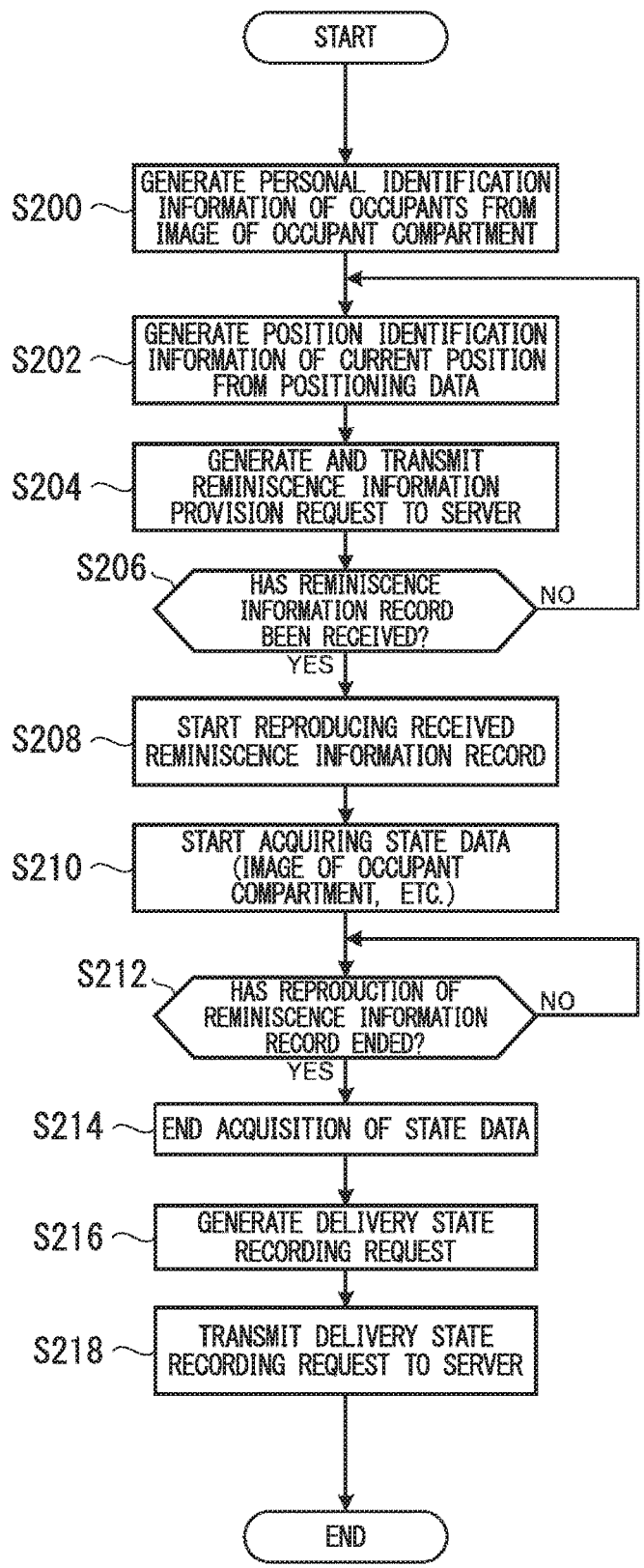
FIG. 8 is a flowchart showing a procedure of a reminiscence information output process executed by the in-vehicle device shown in FIG. 2.

Next, a reminiscence information output process performed by the in-vehicle device 102 will be described with reference to a flowchart shown in FIG. 8. The reminiscence information output process is a process of transmitting a reminiscence information provision request including personal identification information of occupants and position identification information of the current position of the host vehicle 104 to the server 106, receiving a reminiscence information record that the server 106 transmits in response to receipt of the reminiscence information provision request, and outputting an image, a video, and/or sound of content data included in the received reminiscence information record through the display 240 and/or the speaker 232. This process starts, for example, in response to receipt of an instruction to start a reminiscence information output operation from the user via the touch panel 242.

Upon starting the process, first, the input information acquisition unit 212 of the in-vehicle device 102 acquires an image in the occupant compartment of the host vehicle 104 through the interior camera 224 and generates personal identification information of each occupant of the host vehicle 104 from the acquired image of the occupant compartment (S200). Next, the input information acquisition unit 212 generates position identification information indicating the current position of the host vehicle 104 from positioning data (for example, GPS data) output from the positioning device 226 (S202) and generates a reminiscence information provision request including the generated personal identification information and position identification information and device identification information of the in-vehicle device 102 and transmits the generated reminiscence information provision request to the server 106 (S204).

Next, the in-vehicle device 102 determines whether or not a reminiscence information record transmitted from the server 106 has been received through the communication device 202 (S206). When no reminiscence information record has been received (NO in S206), the in-vehicle device 102 returns to step S202 and repeats the process. On the other hand, when a reminiscence information record has been received from the server 106 (YES in S206), the information output unit 214 of the in-vehicle device 102 starts reproducing an image, a video, and/or sound of content data included in the received reminiscence information record (S208). The reproduction of the image, video, and/or sound of the content data may be performed, for example, by outputting the image, video, and/or sound to the display 240 and/or the speaker 232 via the AV device 220.

After starting the reproduction of the reminiscence information record (that is, the reproduction of the image, video and/or sound of the content data included in the reminiscence information record) in step S208, the state acquisition unit 216 of the in-vehicle device 102 starts acquiring state data including an image, a video, and/or sound in the occupant compartment of the host vehicle 104 through the interior camera 224 and/or the microphone 234 (S210).

Next, the information output unit 214 determines whether or not the reproduction of the reminiscence information record started in step S208 has ended (that is, whether or not the content data of the reminiscence information record has been reproduced to the end) (S212). If the reproduction of the reminiscence information record has not ended (NO in S212), the process returns to step S212 and continues the reproduction until the reproduction ends.

On the other hand, when the reproduction has ended (YES in S212), the state acquisition unit 216 ends the acquisition of the state data (S214) and generates a delivery state recording request including reminiscence record identification information included in the reproduced reminiscence information record, the acquired state data, the device identification information of the in-vehicle device 102, and terminal identification information of a terminal device to which the state data is to be delivered (S216). Then, the generated delivery state recording request is transmitted to the server 106 through the communication device 202 (S218) and this reminiscence information output process ends.

When the in-vehicle device 102 has consecutively received a plurality of reminiscence information records, the process may return to step S208 to start reproduction of a next reminiscence information record after transmitting the delivery state recording request to the server 106 in step S218 and may repeat the processing of steps S208 to S218 until reproduction of all the received reminiscence information records ends.

Further, the image or video of the external environments and the image or video of the occupant compartment included in the content data of the reminiscence information record may be simultaneously reproduced, for example, in two windows displayed on the display 240.

<Operation of Server>

Next, the operation of the server 106 will be described. The server 106 performs a reminiscence information recording process, a reminiscence information delivery process, and a delivery state notification process.

[Reminiscence Information Recording Process]

Figure 9:
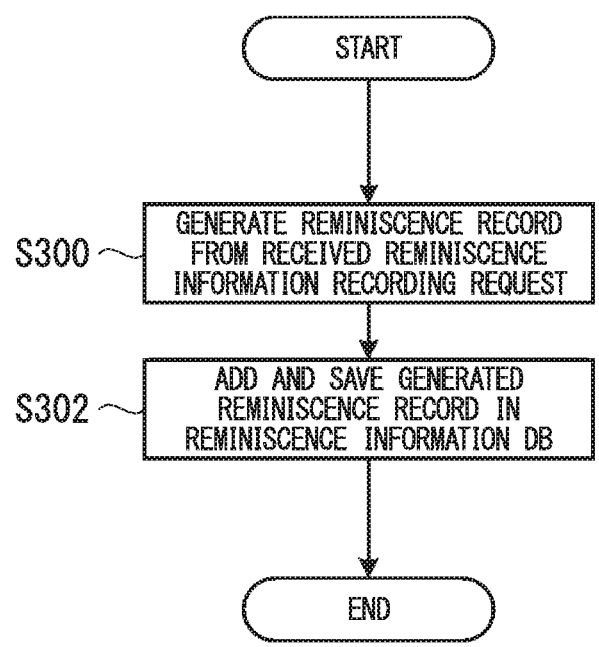
FIG. 9 is a flowchart showing a procedure of a reminiscence information recording process executed by the server shown in FIG. 3.

First, a procedure of the reminiscence information recording process performed by the server 106 will be described with reference to a flowchart shown in FIG. 9. The reminiscence information recording process starts when the server 106 has received a reminiscence information recording request transmitted by any in-vehicle device 102 through the communication device 302.

Upon starting the process, first, the information recording unit 322 of the processing device 320 of the server 106 generates a reminiscence information record from the received reminiscence information recording request (S300). That is, the information recording unit 322 adds unique reminiscence record identification information to content data, position identification information, and personal identification information included in the received reminiscence information recording request to generate a reminiscence information record.

Next, the information recording unit 322 adds and saves the generated reminiscence information record in the reminiscence information DB 310 stored in the storage device 300 (S302) and ends this reminiscence information recording process.

[Reminiscence Information Delivery Process]

Figure 10:
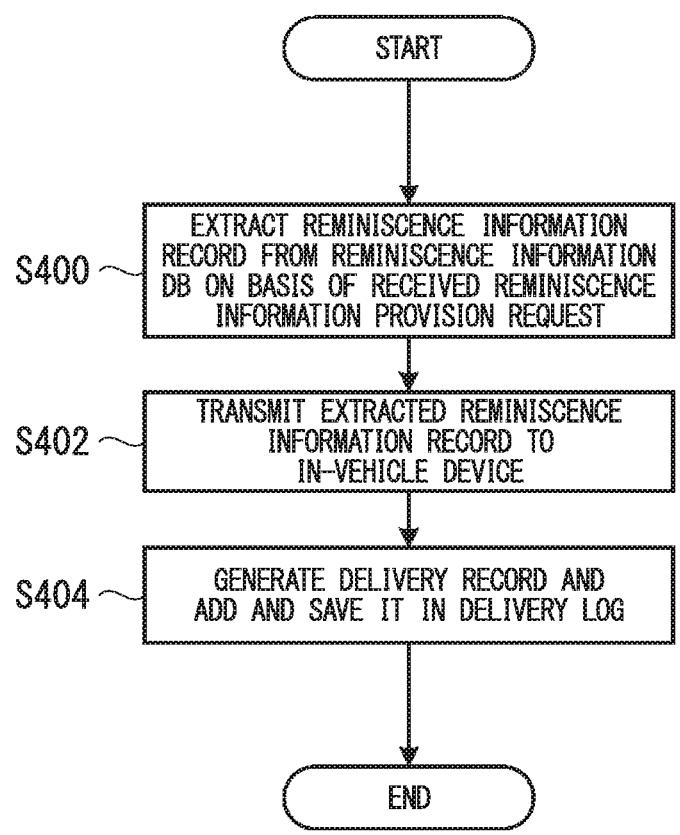
FIG. 10 is a flowchart showing a procedure of a reminiscence information delivery process executed by the server shown in FIG. 3.

Next, a procedure of the reminiscence information delivery process performed by the server 106 will be described with reference to a flowchart shown in FIG. 10. The reminiscence information delivery process starts when the server 106 has received a reminiscence information provision request transmitted by any in-vehicle device 102 through the communication device 302.

Upon starting the process, first, the information extraction unit 324 of the processing device 320 of the server 106 extracts a reminiscence information record from the reminiscence information DB 310 on the basis of the received reminiscence information provision request (S400). That is, the information extraction unit 324 extracts a reminiscence information record including position identification information indicating the same position as that indicated by position identification information included in the received reminiscence information provision request or indicating a position within a predetermined distance range from the position indicated by the position identification information, among reminiscence information records including the same personal identification information as any personal identification information included in the received reminiscence information provision request, from the reminiscence information DB 310.

Next, the information extraction unit 324 transmits the extracted reminiscence information record to the in-vehicle device 102 that has transmitted the received reminiscence information provision request (S402). That is, the information extraction unit 324 transmits the extracted reminiscence information record through the communication device 302 by attaching device identification information included in the received reminiscence information provision request to the extracted reminiscence information record. Upon receiving the transmitted reminiscence information record, the in-vehicle device 102 determines that the received reminiscence information record is destined for the in-vehicle device 102 if the device identification information attached to the received reminiscence information record matches device identification information of the in-vehicle device 102 and performs processing on the received reminiscence information record.

Next, the information extraction unit 324 generates a delivery record indicating that the extracted reminiscence information record has been transmitted (S404). That is, the information extraction unit 324 constructs a delivery record using reminiscence record identification information of the transmitted reminiscence information record, the device identification information of the in-vehicle device 102 which is the transmission destination, and unique delivery record identification information.

Then, the information extraction unit 324 adds and saves the generated delivery record in the delivery log 314 stored in the storage device 300 (S406) and ends this reminiscence information delivery process.

[Delivery State Notification Process]

Figure 11:
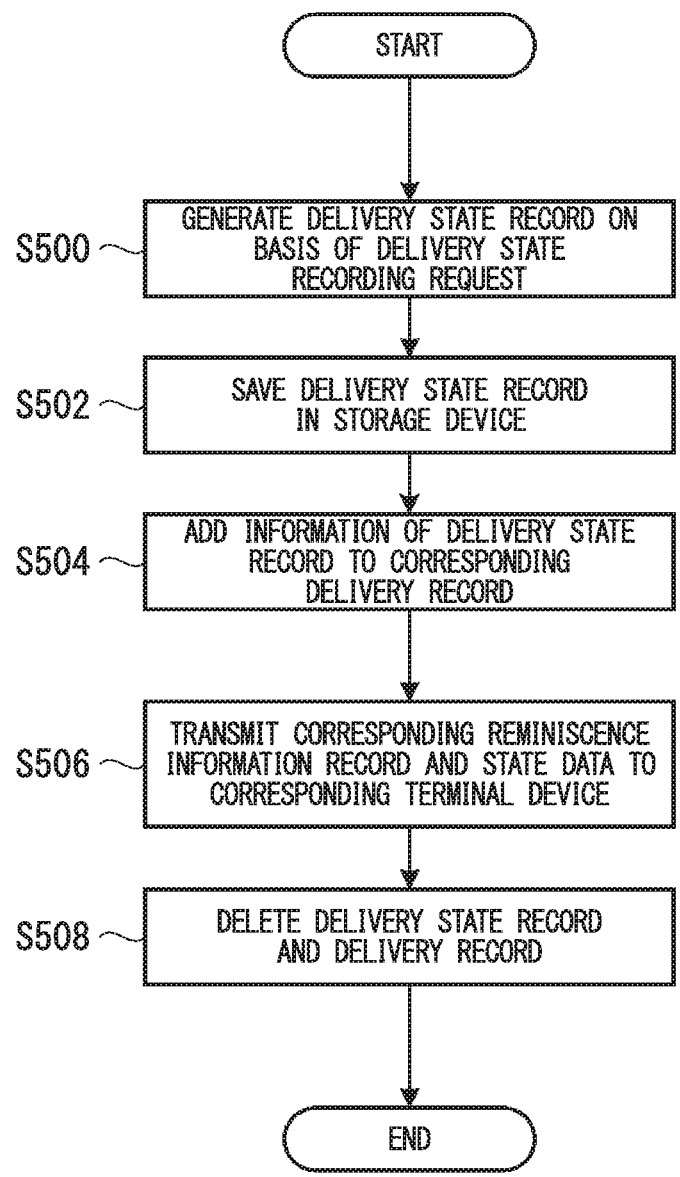
FIG. 11 is a flowchart showing a procedure of a delivery state notification process executed by the server shown in FIG. 3.

Next, a procedure of the delivery state notification process performed by the server 106 will be described with reference to a flowchart shown in FIG. 11. The delivery state notification process starts when the server 106 has received a delivery state recording request transmitted by any one of the in-vehicle devices 102 through the communication device 302.

Upon starting the process, first, the state notification unit 326 of the processing device 320 of the server 106 generates a delivery state record on the basis of the received delivery state recording request (S500). That is, the state notification unit 326 adds unique state record identification information to state data, device identification information, reminiscence record identification information, and terminal identification information included in the received delivery state recording request to generate a delivery state record.

Next, the state notification unit 326 adds and saves the generated delivery state record in the delivery state information 312 stored in the storage device 300 (S502) and then adds and saves information regarding the saved delivery state record in a corresponding delivery record in the delivery log 314 stored in the storage device 300 (S504). That is, the state notification unit 326 specifies a delivery record including device identification information and reminiscence record identification information in the delivery log 314 which match the device identification information and the reminiscence record identification information included in the generated delivery state record and adds and saves the state record identification information included in the generated delivery state record in the specified delivery record.

Next, the state notification unit 326 transmits associated state data and a related reminiscence information record to each related terminal device on the basis of the delivery state record generated in step S500 (S506). That is, the state notification unit 326 transmits the state data included in the delivery state record generated in step S500 and a reminiscence information record in the reminiscence information DB 310 indicated by the reminiscence record identification information included in the delivery state record to each terminal device having the terminal identification information included in the delivery state record.

Next, the state notification unit 326 deletes the delivery state record saved in step S502 from the storage device 300, deletes the delivery record saved in step S504 from the delivery log 314 (S508), and ends the delivery state notification process.

The present embodiment has been described such that the delivery record is generated and held until transmission of the state record or the like is completed. However, generation of the delivery record is not indispensable in the present embodiment.

The present embodiment has also been described such that the state data or the like is transmitted to a predetermined terminal device 108 or the like subsequent to generation of the delivery state record, but the present invention is not limited to this. For example, after a state delivery record is generated and saved in the storage device 300, state data or the like of the saved state delivery record may be transmitted upon receiving a transmission request from the terminal device 108 or the like. In this case, the transmission request may include device identification information of an in-vehicle device 102 of a vehicle 104 of interest and personal identification information of a person of interest and the state notification unit 326 of the server 106 may specify a delivery record including device identification information and personal identification information that match the device identification information and the personal identification information included in the transmission request from the delivery log 314 and may transmit state data or the like to a terminal device 108 or the like indicated by terminal identification information included in a delivery state record indicated by the state record identification information included in the specified delivery record on the basis of the indicated delivery state record. In this case, after transmitting the state data or the like in response to the transmission request from the terminal device 108 or the like, the state notification unit 326 may delete the corresponding delivery record and the corresponding delivery state record immediately or when a predetermined period has elapsed.

As described above, in the information output system 100 of the present embodiment, a reminiscence (an image, a video, and/or a sound) at a geographical position of a person is stored in the server 106 as a reminiscence information record and, when the person rides in the vehicle 104 and travels near the position, the image, video, and/or sound of the reminiscence information record is reproduced in the vehicle 104 and is also delivered to people related to occupants of the vehicle 104 via a specific terminal device 108 or the like. This allows reminiscences of a person who is an occupant of the vehicle 104 to be shared among the occupants and/or with people related to the occupants at an appropriate time.

In the present embodiment, the server 106 is provided outside the vehicle 104 and reminiscence information is stored and delivered in and from the server 106, but the present invention is not limited to this configuration. For example, the server 106 shown in FIG. 3 may be provided in each in-vehicle device 102 or in each host vehicle 104. In this case, the communication device 302 of the server 106 is communicably connected, for example, to only a communication device 202 of an in-vehicle device 102 which includes the server 106 through wired communication (for example, through bus communication). The server 106 may store reminiscence information or the like collected only in the host vehicle 104 via the connected in-vehicle device 102 and may provide the stored reminiscence information only in the host vehicle 104.

What is claimed is:

1. An information output system comprising:
a storage device; and
a processing device configured to select and output information stored in the storage device, wherein the processing device comprises:
a content information acquisition unit configured to acquire, via at least one of a camera or a microphone mounted in a vehicle, content information comprising at least one of an image, a video, or sound of an external environment of the vehicle or an occupant compartment of the vehicle, and to store the content information in the storage device in association with first personal identification information and first position identification information indicating a person and a geographical position, respectively, related to the content information;
an input information acquisition unit configured to generate second personal identification information indicating an occupant of the vehicle and second position identification information indicating a current geographical position of the vehicle;
an information extraction unit configured to, in response to determining that the second personal identification information corresponds with the first personal identification information and that the current geographical position indicated by the second position identification information is within a predetermined distance of the geographical position identified by the first position identification information, extract, from the storage device, the content information that is associated with the first personal identification information and the first position identification information; and
an information output unit configured to, in response to the determining, output the content information through at least one of a display device or a speaker mounted on the vehicle.

2. The information output system according to claim 1, wherein the input information acquisition unit is configured to generate the second personal identification information based on a facial image of the occupant captured by the camera mounted in the vehicle.

3. The information output system according to claim 1, wherein the processing device further comprises a state information acquisition unit configured to generate delivery state information including at least one of another image, another video, or another sound of the occupant compartment of the vehicle when the information output unit outputs the content information.

4. The information output system according to claim 3, wherein the processing device further comprises an information delivery unit configured to deliver the content information and the delivery state information to a predetermined terminal device present outside the vehicle.

5. The information output system according to claim 1, wherein the storage device and the processing device are provided in an in-vehicle device mounted on the vehicle.

6. The information output system according to claim 1, further comprising:
an in-vehicle device mounted on the vehicle; and
a server communicably connected to the in-vehicle device, the server being present outside the vehicle,
wherein the processing device comprises a first processing device comprising the input information acquisition unit and the information output unit and a second processing device comprising the information extraction unit, the in-vehicle device comprises part of the first processing device, and the server comprises the storage device and the second processing device.

7. A server included in the information output system according to claim 6, the server comprising the storage device and the second processing device.

8. An information output method comprising:
acquiring, by a system comprising a processor via at least one of a camera or a microphone mounted in a vehicle, content information comprising at least one of an image, a video, or sound of an external environment of the vehicle or an occupant compartment of the vehicle;
storing, by the system, the content information in a storage device in association with first personal identification information and first position identification information identifying a person and a geographical position, respectively, related to the content information;
generating, by the system, second personal identification information that identifies an occupant of a vehicle and second position identification information that identifies a current geographical position of the vehicle; and
in response to determining that the second personal identification information corresponds with the first personal identification information and that the current geographical position indicated by the second position identification information is within a predetermined distance of the geographical position identified by the first position identification information:
extracting, by the system from the storage device, the content information that is associated with the first personal identification information and the first position identification information, and
outputting, by the system, the content information through at least one of a display device or a speaker mounted on the vehicle.

9. The information output method of claim 8, wherein the generating the second personal identification information comprises generating the second personal identification information based on a facial image of the occupant captured by the camera mounted in the vehicle.

10. A program that, in response to execution by an in-vehicle device which is a computer mounted on a vehicle, causes the in-vehicle device to function as:
a content information acquisition unit configured to acquire, via at least one of a camera or a microphone mounted in the vehicle, content information comprising at least one of an image, a video, or sound of an external environment of the vehicle or an occupant compartment of the vehicle, and to store the content information in a storage device in association with first personal identification information and first position identification information indicating a person and a geographical position, respectively, related to the content information;
an input information acquisition unit configured to generate second personal identification information indicating an occupant of the vehicle and second position identification information indicating a current geographical position of the vehicle;
an information extraction unit configured to, in response to determining that the second personal identification information matches the first personal identification information and that the current geographical position indicated by the second position identification information is within a predetermined distance of the geographical position indicated by the first position identification information, extract, from the storage device, the content information that is associated with first personal identification information and the first position identification information; and
an information output unit configured to, in response to the determining that the second personal identification information matches the first personal identification information and that the current geographical position indicated by the second position identification information is within the predetermined distance of the geographical position indicated by the first position identification information, output the content information through at least one of a display device or a speaker mounted on the vehicle.

11. The program of claim 10, wherein the input information acquisition unit is configured to generate the second personal identification information based on a facial image of the occupant captured by the camera mounted in the vehicle.

* * * * *